Dec. 24, 1929.    L. W. HASSENSALL    1,740,509
DEVICE FOR COOLING LIQUIDS
Original Filed April 20, 1928
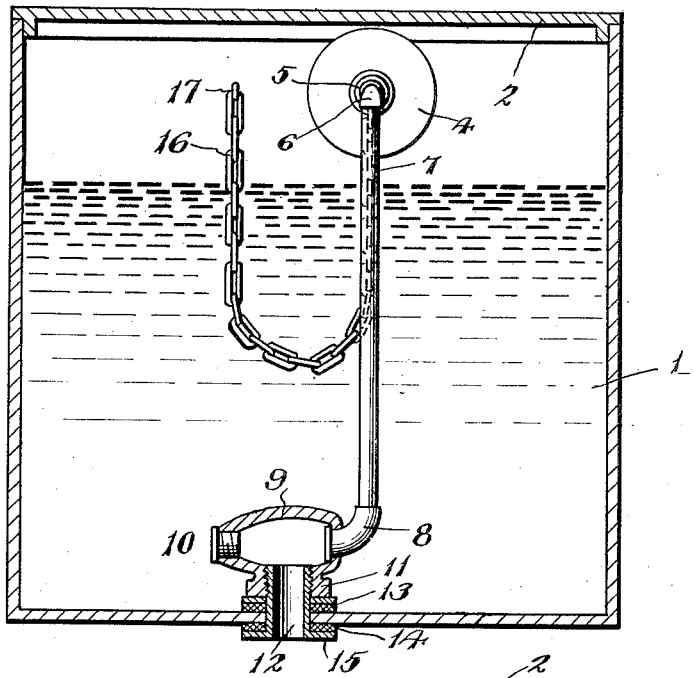
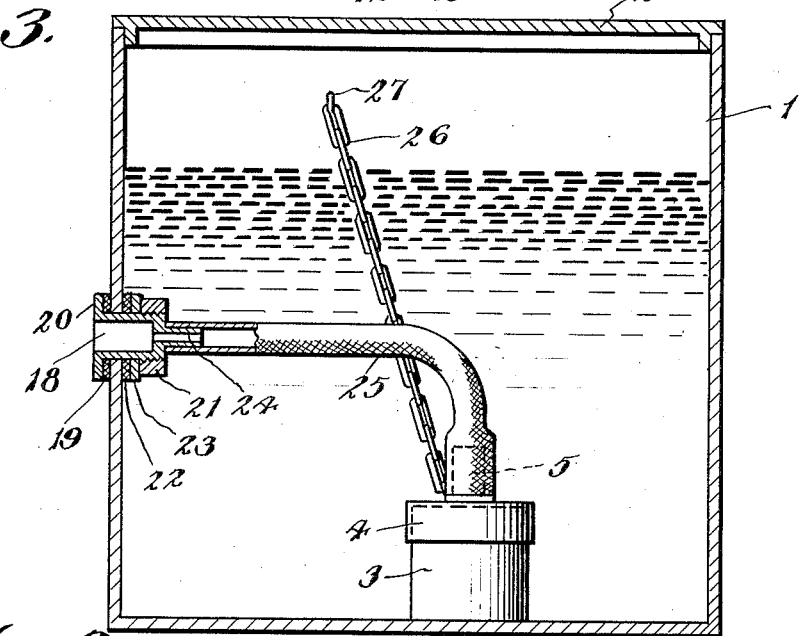
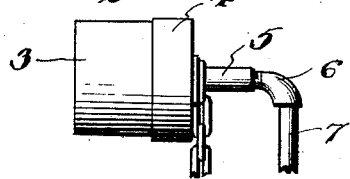
Inventor
L. W. Hassensall
By Lacey & Lacey, Attorneys Patented Dec. 24, 1929

1,740,509

UNITED STATES PATENT OFFICE

LOUIS W. HASSENSALL, OF TOLEDO, OHIO

DEVICE FOR COOLING LIQUIDS

Original application filed April 20, 1928, Serial No. 271,625. Divided and this application filed November 30, 1928. Serial No. 322,828.

This invention relates to refrigeration and more particularly to a device for cooling liquids, such as water, placed in a suitable receptacle.

The present application constitutes a division from my copending application filed April 20, 1928, Serial No. 271,625.

One object of the invention is to provide an apparatus whereby frozen carbonic acid gas may be employed as a cooling medium and thereby eliminate the use of ice and also permit the water to be cooled by a medium capable of being stored in a small receptacle.

Another object of the invention is to provide a device of this character in which a gas container may be easily removed when empty and replaced with a filled container.

Another object of the invention is to permit the cooling apparatus to be permanently connected with the water receptacle but at the same time allow the gas container forming part of the apparatus to be moved upwardly above the normal water level so that an empty container may be removed and a new one substituted without its being necessary for the person changing the containers to dip his hand into the water in order to reach the container.

The invention is illustrated in the accompanying drawing, wherein

Figure 1 is a view showing a water receptacle in section with one form of the invention applied thereto and swung upwardly to allow a filled frozen gas container to be substituted for one from which frozen gas has been expended, Fig. 2 is a view showing the gas container in side elevation, and Fig. 3 is a view similar to Fig. 1 illustrating a modified form of water-cooling apparatus.

The water receptacle or container 1 may be of any desired size and shape and is preferably provided with a cover 2 for its open upper end. The receptacle is normally filled with water to the level shown and this water may be removed in any desired manner or drawn out of the receptacle through a suitable outlet spigot. The receptacle or container 3 for the frozen carbonic acid gas will be of suitable size according to the capacity of the water cooler or receptacle 1 in which it is to be placed and the frozen gas may be placed directly into the container or, if so desired, it may be stored in auxiliary containers at the place of manufacture, and these containers fitted into the containers 3 by the person supplying the frozen gas to a user. It will be understood that if an inner container is employed it will have openings formed therein so that evaporating gas may escape and pass out through the outlet pipe. The removable cover 4 of the container 3 fits tightly thereon and is provided with an outlet neck 5 which may be connected therewith in any desired manner in operative relation to an outlet opening formed in the cover. It will be understood that the cover 4 has a tight fit upon the container or receptacle 3 and an air-tight joint will be provided between the container and cover in any suitable manner. The frozen carbonic gas used as a cooling medium is of a snow-like consistency and may be molded into the desired shape to fit into and fill the container 3 and if it is desired to provide a quantity which will last a relatively long length of time the frozen gas may be compressed into a solid mass in which state it resembles a cake of ice.

An elbow 6 is screwed into the neck 5 and is engaged with a tube or pipe 7 which has its other end screwed into or otherwise suitably engaged with an elbow 8 loosely received in one end of a hollow terminal 9. This terminal has its end opposite from the elbow 8 closed by a removable plug 10 and is formed with a side extension 11 having a threaded bore communicating with the interior of the shell. The threaded bore of the side arm receives the threaded end of a hollow fastener 12 which is passed through an opening formed either in a side wall or the bottom of the water receptacle, and it will be readily understood that, when the fastener is screwed tightly into place with the washers 13 and 14 compressed between the side arm and annular flange 15 of the fastener, the terminal will be securely held in place and water prevented from leaking through the opening in the water receptacle. Since the elbow 8 fits loosely in the terminal, the discharge pipe will be pivotally mounted for vertical movement, and therefore, when the chain 16 which is suspended from a hook 17 within the water cooler is drawn upon, the gas container may be drawn upwardly above the water in the cooler, as shown in Fig. 1, where it may be removed and a filled one substituted. After a filled container is set in place, it will sink until it rests upon the bottom of the water cooler in an upright position and as the gas passes from the container through the discharge pipe to the terminal and out through the hollow fastener the water in the cooler or water receptacle will be chilled. The tube or pipe 7 may be formed as a coil if so desired and thereby increase the cooling action.

In Fig. 3, the hollow fastener which is indicated by the numeral 18 is passed through an opening in a side wall of the water receptacle with a washer 19 disposed between the wall of the receptacle and the collar 20 of the fastener and is held in place by a securing nut 21 screwed upon its inner end and bearing against washers 22 and 23 disposed about the fastener. A nipple 24 extends from the inner end of the hollow fastener and fits into one end portion of a discharge pipe 25. This discharge pipe is flexible and preferably formed of rubber although other materials may be substituted and has its other end portion fitted upon the neck 5 of the gas container where it may be held either by its frictional grip with the neck or through the medium of a suitable clamp disposed about it and tightened. When this form of the invention is employed, the gas container may be easily drawn upwardly by the chain 26 which corresponds to the chain 16 and is suspended from a hook 27 and after a filled container has been substituted for an empty one the chain released and the container allowed to sink to the bottom of the water cooler.

I have, therefore, provided a very convenient means whereby frozen carbonic acid gas may be employed as a cooling medium for drinking water. While it is stated that the gas is to be employed to chill drinking water, it will be understood that other liquids may be poured into the receptacle instead of water.

Having thus described the invention, I claim:

1. A cooling device to be disposed within a water container comprising a receptacle adapted to contain frozen gas, said receptacle being open at its top and having a flat bottom whereby the receptacle may rest upon the bottom of the water container in an upright position, a cover for said receptacle removably engaged therewith and having a tubular neck constituting an outlet neck when the cover is applied to the receptacle, a discharge pipe connected with said neck, and a hollow terminal connected with said pipe and adapted to be secured in an opening formed in the container.

2. A cooling device to be disposed within a water container comprising a receptacle adapted to contain frozen gas, a cover for said receptacle having an outlet neck, a discharge pipe having one end connected with said neck, and a terminal loosely connected with the other end of said pipe to pivotally mount the same, the said terminal including a hollow body having an outlet, and a tubular fastener screwed into the outlet and adapted to project through a water container externally thereof.

3. In a water cooler, a water container having a bottom and side walls, and cooling means including a receptacle for cooling gas, a cover for said receptacle, an outlet neck for said cover, a pipe having one end connected with said neck, and a hollow terminal connected with the other end of said pipe and secured in an opening in the water container whereby gas may pass from the receptacle through the pipe and out of the container.

4. In a water cooler, a water container having a bottom and side walls, and cooling means including a receptacle for cooling gas, a cover for said receptacle, an outlet neck for said cover, a pipe having one end connected with said neck, a hollow terminal loosely connected with the other end of said pipe to pivotally mount the pipe and having a side extension formed with a threaded bore, and a tubular fastener passed through an opening in the water container and having a flange about its outer end and its inner end portion screwed into the bore whereby the terminal is firmly connected with the water container.

5. In a water cooler, a water container having a bottom and side walls, and cooling means including a receptacle for cooling gas, the receptacle being provided with an outlet, a pipe having one end communicating with the outlet of the receptacle, a hollow terminal connected with the other end of said pipe and secured in operative relation to an opening in the water container, and means to draw the gas receptacle above the normal water level of the container.

6. In a water cooler, a water container having a bottom and side walls, and cooling means including a receptacle for cooling gas, the receptacle being provided with an outlet, a flexible pipe having one end communicating with the outlet of the receptacle, and a hollow terminal connected with the other end of said pipe and adapted to be secured in operative relation to an opening in the water container.

In testimony whereof I affix my signature.

LOUIS W. HASSENSALL. [L. S.]